United States Patent [19]

Kussy

[11] 3,987,340

[45] Oct. 19, 1976

[54] COMBINATION MOTOR CONTROLLER INCLUDING RESISTOR SHUNTED FUSIBLE ELEMENTS

[75] Inventor: Frank W. Kussy, Haverford, Pa.

[73] Assignee: I-T-E Imperial Corporation, Spring House, Pa.

[22] Filed: May 29, 1973

[21] Appl. No.: 364,827

[52] U.S. Cl. .................... 317/13 R; 317/13 B; 317/40 A; 317/38
[51] Int. Cl.² ........................................ H02H 7/085
[58] Field of Search .......... 317/40, 40 A, 46, 13 A, 317/13 B, 13 R, 38; 337/160, 158, 161, 283

[56] References Cited
UNITED STATES PATENTS

| | | | |
|---|---|---|---|
| 2,358,215 | 9/1944 | Darling | 317/40 A |
| 2,502,992 | 4/1950 | Rawlins et al. | 317/40 A |
| 2,653,203 | 9/1953 | Kozacka | 337/160 |
| 2,823,338 | 2/1958 | Edsall | 317/46 |
| 2,920,164 | 1/1960 | Edsall | 317/38 |
| 2,920,241 | 1/1960 | Jacobs, Jr. et al. | 317/46 |
| 2,965,809 | 12/1960 | Edsall | 317/13 R |
| 3,193,730 | 7/1965 | Martin | 317/46 |

Primary Examiner—J D Miler
Assistant Examiner—Patrick R. Salce
Attorney, Agent, or Firm—Ostrolenk, Faber, Gerb & Soffen

[57] ABSTRACT

A combination motor starter connecting a three-phase motor to a source capable of delivering short circuit currents of approximately 100,000 amps is constructed of a molded case circuit breaker having a magnetic trip means, an electromagnetic contactor, overload relay means, and fusible short circuit protector means, all connected in series. The overload relay means brings about opening of the contactor upon the occurrence of overload currents, the magnetic trip means brings about opening of a circuit breaker upon the occurrence of fault currents that the other elements of the starter circuit can withstand without damage for as much as one cycle, and the protector means opens the circuit under severe fault current conditions in a time interval sufficiently short to prevent destruction of any reusable circuit elements. Each pole of the protector means includes a fusible element connected in parallel with a resistor. Upon the occurrence of a severe fault current, the fusible element ruptures and thereafter current is limited by a resistor, in parallel with the element, to a value in the fault current range. This fault current through the resistor is of a duration sufficient to cause opening of the circuit breaker and also cause destruction of the resistor.

8 Claims, 3 Drawing Figures

COMBINATION MOTOR CONTROLLER INCLUDING RESISTOR SHUNTED FUSIBLE ELEMENTS

This invention relates to coordinated circuit elements constituting a combination motor starter and includes resistor paralleled fusible protectors for limiting the buildup of extremely high, available short circuit currents.

In the Cataldo et al. copending U.S. patent application Ser. No. 248,859, filed May 1, 1972, entitled "Motor Protecting Means", and assigned to the assignee of the instant invention, there is described a coordinated system in which an electromagnetic contactor is combined with fusible protector units resulting in a device whose elements, except for the expendable fusible protectors, are protected against damage upon the occurrence of severe fault conditions.

It has been found that high current faults do not occur frequently, but are generally the result of an improper initial installation. Low current faults occur much more frequently than high current faults. Because of tolerance considerations, low and high current fault ranges overlap to some extent, so that in the system of the aforesaid application Ser. No. 248,859, the fusible protectors must be constructed to operate at the high end of the low current fault range, so that if faults at this high end of the low current fault range occur very often the replacement of fusible protectors becomes objectionable.

To alleviate this problem, the instant invention utilizes a molded case circuit breaker having an instantaneous or magnetic trip means for interrupting fault currents, and the operating range of the fusible protectors is moved upward to a range of severe fault currents.

In a practical coordinated system constructed in accordance with the instant invention, the overload relays are effective to cause tripping at running overloads, usually less than 6 times full load motor current. Fault current tripping of the circuit breaker occurs in the range of from 6 to 13 times full load motor current, but at a level that will prevent damage to the contactor, overload relay, motor, and branch circuit wiring. The fusible protectors rupture under severe fault current conditions, but rapidly enough to prevent damage to the other elements of the protective device.

In order to prevent single phasing without utilizing ejector pin type devices operated by the fusible protectors, the fusible element of each protector is paralleled by a resistor that limits current after rupturing of the fusible elements to a value in the tripping range of the circuit breaker. Thus, a short time after the fusible element ruptures, the circuit breaker trip mechanism operates and circuit interruption takes place within 0.5 to 1.0 cycle. The energy passing through the resistor is also sufficient to cause rupturing thereof.

Accordingly, a primary object of the instant invention is to provide a novel, completely coordinated system of components connected to constitute a combination motor starter including overload relay heaters, electromagnetic contactors, circuit breakers, and fusible protectors listed on a table so that the user is assured complete protection if he follows simple instructions.

Another object is to provide a coordinated system of this type in which the fusible elements are each paralleled by a resistor that permits current flow after rupturing of the fusible elements but limits this current to a value in the magnetic or instantaneous trip range of the circuit breaker.

A further object is to provide a coordinated system of this type in which the components protect one another to the extent that, except for the fusible protectors, none of the elements is destroyed even upon the occurrence of severe fault currents.

These objects as well as other objects of this invention will become readily apparent after reading the following description of the accompanying drawings in which.

Figure 1:
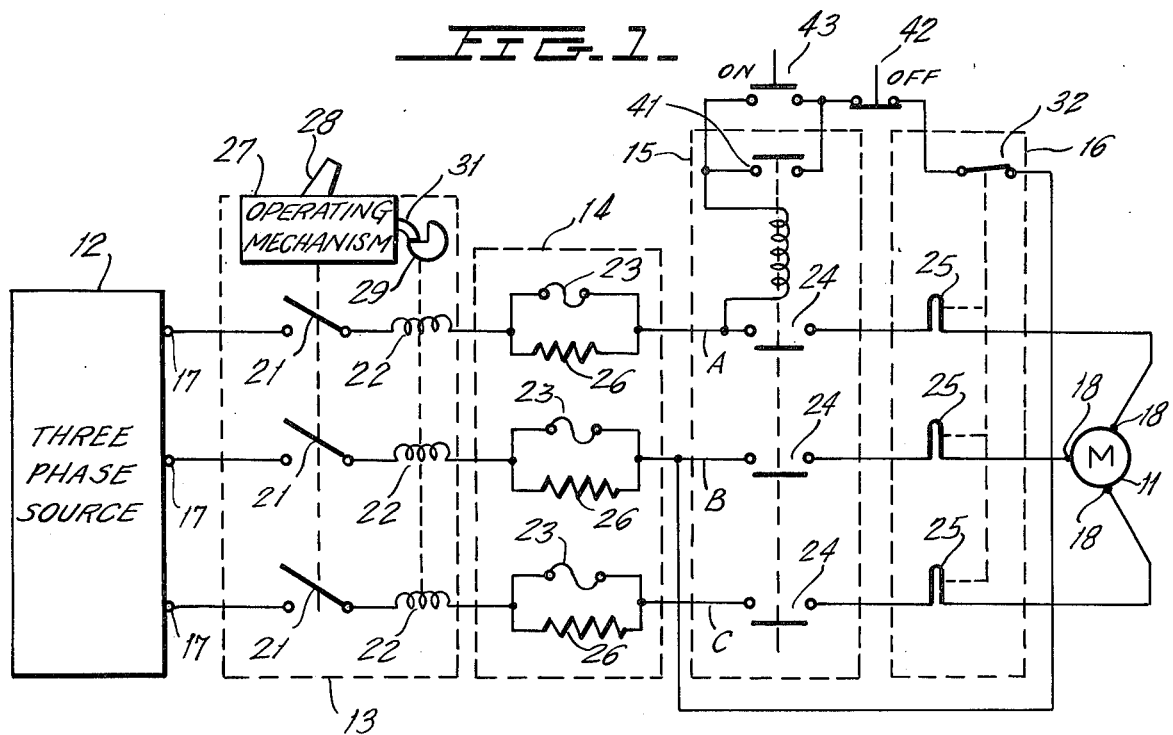
FIG. 1 is an electrical schematic of motor control apparatus constructed in accordance with teachings of the instant invention.

Now referring to the figures and more particularly to FIG. 1, showing three-phase motor 11 connected to three-phase energizing source 12 by motor control apparatus constructed in accordance with the instant invention, said apparatus consisting of three-pole circuit breaker 13, three-pole high fault current protector means 14 (hereinafter HFCP), three-pole electromagnetic contactor 15, and three-pole overload relay 16. Circuit breaker 13 is interposed between source 12 and HFCP 14. Overload relay 16 is interposed between motor 11 and contactor 15, and HFCP 14 is interposed between circuit breaker 13 and contactor 15.

Circuit breaker 13 is a standard molded case device provided with a magnetic or instantaneous fault current responsive automatic trip means, but is not provided with a time delay or thermal responsive automatic trip means. Overload trip means 16 is of a type described in U.S. Pat. No. 3,288,964, issued Nov. 29, 1966, to J. B. Cataldo et al., for a "Spring Trip Multi-Phase Overload Relay, etc."

There are three identical series paths between each of the source terminals 17 and an individual one of the motor terminals 18. Each of these paths between terminals 17 and 18 consists of circuit breaker contacts 21, circuit breaker magnetic trip coil 22, fusible element 23 of HFCP 14 paralleled by resistor 26, main contacts 24 of contactor 15, and overload current responsive heater 25 of overload relay 16.

Circuit breaker 13 also includes spring powered operating mechanism 27 for simultaneously opening and closing contacts 21 of all three poles. Mechanism 27 is operable by manually engageable handle 28 and is also operable responsive to fault currents detected by any of the overload tripping coils 22, which are effective to release latch 29 that normally holds releasable portion 31 of operating mechanism 27 in its reset or operating position. Contactor 15 also includes operating coil 36 which, upon energization thereof, closes normally open holding contacts 41 and main contacts 24 of all three poles. A spring means (not shown) biases contacts 24 and 41 to open circuit position. One end of operating coil 36 is connected directly to line A of source 12, and the other end of coil 36 is connected through a series circuit to line B of source 12. This circuit consists of normally closed contacts 32 of overload relay means 16, normally closed manually operable OFF switch 42, and the parallel combination of holding contacts 41 and normally open manually operable ON switch 43. In a manner well known to the art, when any of the heaters 25 is subjected to predetermined overload conditions, overload relay contact 32 will open, thereby deenergizing contactor operating coil 36 and permitting contacts 24 to open.

For each pole of HFCP 14, fusible element 23 and resistor 26 may be separately housed devices although, it appears preferable to have fusible element 23 and resistor 26 in a common housing, so that heat developed by current flow through fusible element 23 will raise the temperature of resistor 26, for a reason that will be seen after reading this entire specification.

Figure 2:
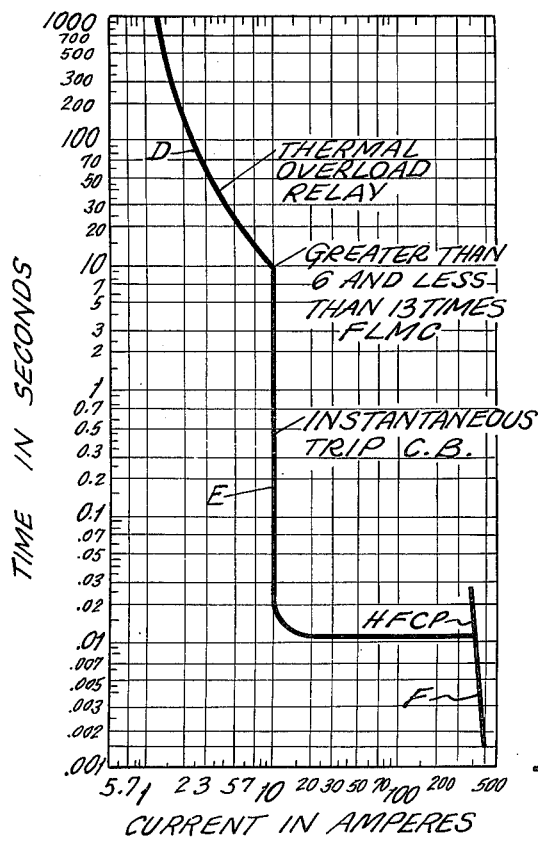
FIG. 2 is a graph illustrating the relationships between the tripping characteristics of the overload and fault current responsive elements of the apparatus illustrated in FIG. 1.

Referring to FIG. 2, the tripping characteristic of overload relay 16 is illustrated by curve D, the tripping characteristic of circuit breaker 13 is illustrated by curve E, and the tripping or rupturing characteristic of each fusible element 23 of HFCP 14 is illustrated by curve F. For a practical example of the coordination between motor control elements 13-16, their operation will now be explained in connection with motor 11, whose locked rotor current is 6 times full load motor current (FLMC). In this case overload relay 16 must be responsive to running overloads. That is, overload relay 16 must cause tripping at less than 6 times FLMC. Further, contactor 15 as well as the branch circuit wiring must be self-protecting, at least up to 6 times FLMC. As a practical matter, motor 11 and the branch circuit wiring are required to be self-protecting up to 13 times FLMC.

Instantaneous trip circuit breaker 13 is calibrated for tripping at fault currents having a low limit in the range between 6 and 13 times FLMC, with interruption being completed within ½ to 1 cycle, so that the let-through energy will not be sufficient to damage any of the elements of the motor controller, branch wiring, or motor 11. The very steep characteristic F of the HFCP fusible element 23 limits let-through energy to the withstandability of all other elements in the circuit of FIG. 1.

Figure 3:
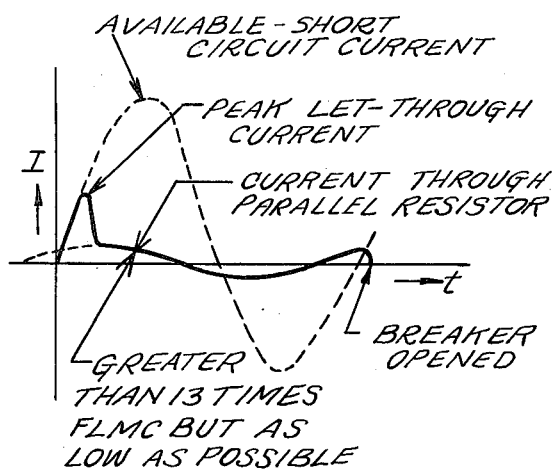
FIG. 3 is a time current plot illustrating principles of interruption for the apparatus illustrated in FIG. 1.

Upon the occurrence of extreme fault current conditions that are limited and cleared by HFCP 14 (see FIG. 3), as soon as fusible element 23 melts or burns out and current flow therethrough ceases, current then takes a parallel path through resistor 26. The latter is proportioned so that current of approximately 13 times FLMC continues to flow, so that magnetic trip means 22 will cause circuit breaker 13 to open and deenergize all phases A, B, C between source 12 and motor 11. The physical construction of resistor 26 is such that on rupturing of fusible element 23, the let-through energy will not only be sufficient to trip circuit breaker 13 but will also cause destruction of resistor 26. In the event that resistor 26 fails to burn out at the time circuit breaker 13 opens, in-rush currents during a subsequent attempt to start motor 11 will cause burnout of resistor 26.

For a detailed discussion of the manner in which elements 13-16 are constructed and coordinated, reference is made to the article entitled "Total Motor Branch Circuit Protection With Instantaneous Trip-Type Circuit Breakers And High Fault Circuit "Protectors (HFCP)" by F. W. Kussy, B. DiMarco, and K. W. Swain, beginning at page 527 in the IEEE Conference Record of IAS, 1972.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appending claims.

The embodiments of the invention in which an exclusive privilege or property is claimed are defined as follows:

1. A system of coordinated multipole circuit devices for controlling operation of a motor drawing a predetermined full load current; said devices including overload relay means, an electromagnetic contactor, fusible protector means and a circuit breaker; circuit means connecting individual poles of said overload relay means in series with individual poles of each of said contactors, said protector means, and said circuit breaker; said overload relay means operatively connected to said contactor for opening of the latter when the relay means is subjected to overload currents in a predetermined range above said full load current; said circuit breaker including contact means, a mechanism connected to said contact means for opening and closing the latter, and magnetic trip means connected to said mechanism for operating the latter to open said contact means when said trip means is subjected to fault currents in a range above said overload currents; said protector means being constructed to rupture when subjected to severe fault currents and limit duration thereof so that let-through energy will not render the others of said devices inoperable; each pole of said protector means including a fusible element and a parallel connected resistor so proportioned that upon the occurrence of severe fault currents the fusible element will rupture and thereafter the resistor will limit current to a value in said fault current range for a time period sufficient to destroy said resistor after actuation of said trip means to operate the operating mechanism and open the contact means.

2. A system as set forth in claim 1 in which the circuit breaker also includes a molded insulating housing.

3. A system as set forth in claim 2 in which the circuit breaker is constructed for circuit interruption in the range of 0.5 to 1.0 cycle.

4. A system as set forth in claim 1 in which the devices are coordinated to protect one another when said system is connected to an energizing source having an available short circuit current in the range of 100,000 amperes; each pole of said protector means also including a common housing for said fusible element and said resistor.

5. A system as set forth in claim 1 in which the range of fault currents falls between 6 and 13 times the full load current.

6. A system as set forth in claim 5 in which the circuit breaker also includes a molded insulating housing.

7. A system as set forth in claim 6 in which the circuit breaker is constructed for circuit interruption in the range of 0.5 to 1.0 cycle.

8. A system as set forth in claim 7 in which the devices are coordinated to protect one another when said system is connected to an energizing source having an available short circuit current in the range of 100,000 amperes; each pole of said protector means also including a common housing for said fusible element and said resistor.

* * * * *